United States Patent Office 3,568,409
Patented Mar. 9, 1971

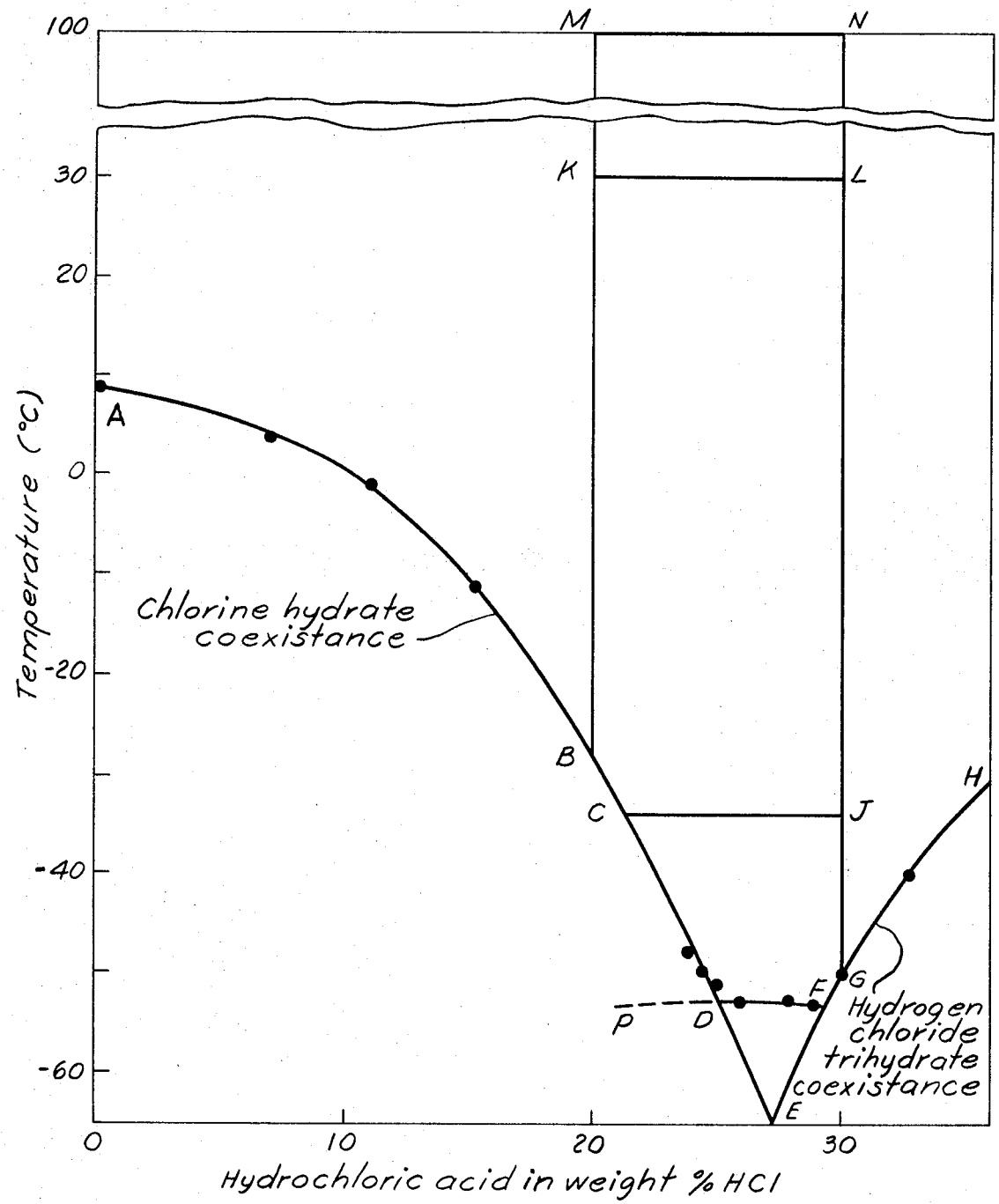

3,568,409
HYDROCHLORIC ACID TREATMENT FOR CHLORINE
Mac B. Ferguson, Jeffrey F. Gilbert, and David N. Glew, Sarnia, Ontario, Canada, assignors to The Dow Chemical Company, Midland, Mich.
Filed June 4, 1969, Ser. No. 830,448
Int. Cl. B01d 53/00
U.S. Cl. 55—71
7 Claims

ABSTRACT OF THE DISCLOSURE

Disclosed herein is a process for removing salt sprays, water and nitrogen trichloride from elemental chlorine, by contacting the chlorine with hydrochloric acid. The acid concentration by weight is from 20 to 30 percent.

BACKGROUND OF THE INVENTION

In the production of chlorine by brine electrolysis, the product gas is frequently contaminated with water vapor, nitrogen trichloride vapor and droplets of brine. The nitrogen trichloride impurity is explosive and highly shock-sensitive and is therefore especially undesirable.

In attempting to remove impurities, it has been the practice to scrub the contaminated chlorine gas with concentrated sulphuric acid, e.g. by passing the gas upward through a column packed with inert materials while allowing the concentrated acid to percolate downward counter-currently to the chlorine flow. The water content of the scrubbed chlorine is reduced by this procedure. However, only part of the brine impurity is removed and the nitrogen trichloride impurity is relatively unaffected. Additionally, concentrated sulphuric acid tends to react with the brine salt spray to produce a finely dispersed sodium sulphate-chloride aerosol which is highly corrosive to the apparatus employed in the process.

SUMMARY OF THE INVENTION

In the present invention, a mixture comprising chlorine in either gaseous or liquid form, and impurities such as brine spray, water or nitrogen trichloride is contacted with hydrochloric acid in which hydrogen chloride is within a limited and critical concentration range as hereinafter defined. The chlorine so treated is separated from the hydrochloric acid mixture in an unusually pure state. Frequently it contains less than about 1 part per million $NCl_3$, and greatly reduced amounts of any other contaminants in the mixture, e.g. brine and water. The acid, which is contaminated with ammonium chloride from absorption of nitrogen trichloride, can be diluted with water to an HCl concentration of less than about 20 weight percent to destroy the ammonium chloride, as described in copending application, Ser. No. 830,528. The treated acid can then be employed as an acidulating agent for brine in the electrolytic production of chlorine.

The accompanying figure is a phase diagram for water, hydrogen chloride, and chlorine at about one atmosphere of pressure.

The present invention is eminently suitable for the simultaneous removal of water and $NCl_3$ from chlorine gas, nonetheless it can also be applied to the removal of one of these impurities in the absence of the other. For example, the invention may be applied to the drying of chlorine which contains no $NCl_3$. Conversely, the invention is also useful for removing $NCl_3$ from dry chlorine gas. The process of the invention is especially applicable where the chlorine mixture comprises (in addition to chlorine) nitrogen trichloride, water or water vapor and aqueous brine or brine spray. A typical mixture produced by brine electrolysis comprises chlorine contaminated with from about 600 to 12,000 parts per million by weight (p.p.m.) of water, from about 10 to 150 p.p.m. of nitrogen trichloride and from about 5 to 100 p.p.m. of brine (a mixture of inorganic salts such as NaCl, and water). Other impurities frequently present are carbon tetrachloride, hexachloroethane, chloroform and other chlorinated organic materials formed in the electrolysis of brine to produce chlorine.

Concentration of hydrogen chloride (HCl) in the acid is preferably less than about 30 percent by weight. If the HCl concentration rises above this level (30%), the thus purified gaseous chlorine may contain undesirably large amounts of HCl. The acid concentration can be as low as about 20 percent by weight. For efficient removal of impurities from the chlorine, the lower limit on HCl concentration should preferably be about 23% by weight.

The temperature at which the contacting step is carried out is determined in relation to the temperature of the acid. It is possible to carry out the invention at temperatures as high as +100° C., but at these high temperatures the water content of the chlorine gas would not be efficiently reduced and, additionally, the chlorine gas thus treated could be contaminated with relatively higher levels of hydrogen chloride. The acid temperature during contacting should preferably be within the range of from about plus 30° C. to about minus 50° C. From about plus 30° C. down to about minus 34° C., the chlorine in the mixture is gaseous, and the contacting step will consist of contacting the liquid acid with gaseous chlorine. Operating the process at temperatures below about minus 34° C. at atmospheric or near atmospheric pressure offers the added advantage that the chlorine is simultaneously scrubbed, dried, purified and liquefied by contact with the cold aqueous hydrochloric acid. The conditions of temperature and HCl concentration as described immediately hereinabove fall within and are generally defined by the envelope MKBCDFGJLN shown in the accompanying figure.

FURTHER DESCRIPTION AND PREFERRED EMBODIMENT

In the preferred embodiment of the invention, the chlorine mixture is gaseous, i.e. the mixture comprises chlorine gas, water vapor, brine spray and nitrogen trichloride. The gaseous mixture is contacted with hydrochloric acid wherein the HCl content is from about 20 to about 30 weight percent, and the purified gaseous chlorine is separated from the acid.

During contacting, the temperature of the acid is above the boiling point of the chlorine, e.g. about minus 34° C. at 1 atmosphere of pressure. The upper limit on the acid temperature is about plus 100° C. In normal practice of the invention, the temperature of the acid is from about plus 30° C. to about minus 34° C. Preferably the acid temperature is from about plus 10° C. to about minus 34° C.

The contacting step can be carried out by allowing the gaseous chlorine mixture to bubble through the acid. Alternatively, the contacting step can be carried out by introducing the acid at the top of a vertical column such as a packed column or a plate column while introducing the gas at the bottom of the column. The gas will pass upwards through the column and in so doing will contact the acid sufficiently so that the aqueous impurities and nitrogen trichloride are largely removed from the gas phase into the acid phase. Many other conventional methods of achieving liquid-gas contact can also be employed.

In the contacting step the volume of acid in relation to gas is not critical unless extremely large amounts of water, brine, nitrogen trichloride or other impurities are present. For example, when contacting is carried out in an Oldershaw column with 15 theoretical plates, and the chlorine flow through the column is 700 cc./minute, the flow of acid through the column should be at least 10 cc./minute for good results. If the emerging gas stream contains undesirable amounts of water vapor, brine spray or nitrogen trichloride, the rate of acid flow can be increased or the gas flow can be decreased.

In carrying out the present invention, the pressure of the chlorine gas mixture is not critical. Gas pressures of about one atmosphere (760 torr.) are operable. Gas pressures in excess of one atmosphere can also be employed although the structural strength of processing equipment must be correspondingly increased. Pressures lower than one atmosphere can also be employed although at lower pressures, the chlorine product is correspondingly more contaminated with HCl.

In another embodiment of the invention, as applied to gaseous chlorine in admixture with nitrogen trichloride and aqueous impurities, the process is carried out by contacting the contaminated gaseous chlorine with acid below about minus 34° C. During contacting, the chlorine gas is liquefied and becomes admixed with the liquid acid. The resulting liquid mixture swiftly separates into two continuous liquid phases when allowed to stand. The uppermost phase comprises the acid and a large portion of the contaminants formerly in the chlorine. The lower phase is essentially liquid chlorine. The two continuous liquid phases are readily separated by normal liquid-liquid separation techniques. Conveniently, the liquid chlorine can be separated from the acid phase by decantation.

In the immediately preceding description, liquefaction of the gaseous chlorine was accomplished upon or during contact with the liquid acid. Alternatively the chlorine gas mixture can be liquefied prior to contact with the acid so that the process then comprises contacting two liquid phases and separating the chlorine. In practice however, it has been proved difficult to ensure sufficient contact between the two liquid phases to provide an efficacious treatment within a resonable contact time.

The contacting step can be carried out by introducing the chlorine mixture (either gaseous or liquid) into a corrosion resistant vessel containing the acid. For example, where the vessel is a column, chlorine gas can be introduced at the bottom as the cooled acid is introduced at the top of the column. Upon contact with the acid, a large portion of the chlorine will liquefy and flow out from the bottom of the column with the liquid acid. A certain proportion of the gas, however, may not liquefy and may pass instead from the top of the column. For example, a gaseous chlorine stream at 25° C. was fed at a rate of about 500 cc./minute into the bottom of a 15-plate Oldershaw column. The upward-flowing gas was contacted with 25 percent hydrochloric acid flowing downwards through the column at a rate of 13.5 cc./minute. The temperature of the acid was about minus 62° C. About 20 percent of the chlorine gas remained gaseous and passed from the top of the column and was recirculated. The remaining 80 percent of the gas was liquefied and passed from the bottom of the column as liquid chlorine in admixture with the acid. The temperature of this liquid-liquid mixture was about minus 50° C. To obtain more complete liquefication, the flow rate of the chlorine gas mixture can be reduced or the number of plates in the column can be increased.

As described above, the chlorine mixture can be either gaseous or liquid. In practice, especially at temperatures below about minus 34° C., the chlorine mixture can be partially liquid and partially gaseous. The exact extent of liquefication upon contact with the acid depends primarily upon the temperature, flow rate of the gas in relation to acid flow rate and pressure. Conveniently, such contacting is carried out countercurrently in a vertically-mounted column. These variables can be readily manipulated to achieve the desired ratio of gaseous chlorine to liquid in the purified chlorine stream. In any event, the process is operable whether the chlorine mixture is entirely gaseous, entirely liquefied, or partially gaseous and partially liquid. Generally, when the acid temperature is from about minus 34° C. to about minus 60° C., the volumetric ratio of chlorine flow rate/acid flow rate should be suffiicently low to ensure that the chlorine is primarily liquid.

Where the chlorine mixture is to be at least partially liquid, at normal atmospheric pressure, the temperature is about minus 34° C. or less. The acid temperature can range to as low as about minus 60° C. However, various solid phases tend to form when the temperature is reduced below minus 50° C. so that preferably the acid temperature will not be lower than about minus 50° C.

With reference to solid phase formation, the figure shows the temperature/composition solid phase formation diagram for the water-hydrogen chloride-chlorine system at about one atmosphere pressure. At temperatures and hydrochloric acid percentages below the chlorine hydrate coexistence, curve ABCD, a solid chlorine hydrate separates from the system. At temperatures below and at hydrochloric acid percentages greater than shown by the hydrogen chloride trihydrate coexistence, curve EFGH, the solid hydrogen chloride trihydrate precipitates from the system. At temperatures below curve PDF, and hydrochloric acid percentages between 24 and 30, as indicated by the ternary compound coexistence curve PDF, a solid ternary compound, comprised of chlorine, hydrogen chloride and water, precipitates from the system.

In order to avoid solids formation and the operational difficulties attendant thereon, it is necessary to carry out the instant invention under conditions of temperature and hydrochloric acid percentage embraced by the envelope BCDFGJNM. Where it is desired to carry out the process with liquefaction of chlorine, the combined temperature and hydrochloric acid parameters should fall within envelope CDFGJ.

The following examples are set forth to further illustrate the invention.

Example 1

A sample of electrolytically-produced chlorine gas was found to comprise about 27 p.p.m. nitrogen trichloride and about 7900 p.p.m. of water, plus small amounts of other impurities such as chlorinated organic materials. The temperature of the gas mixture was about 26° C. and the gas pressure was about 751 torr. The gas mixture was introduced into the bottom of a vertically-mounted 15-tray Oldershaw column while simultaneously 26 percent hydrochloric acid was introduced at the top of the column. As the gas passed upwards through the column it came into contact with the acid passing downwards through the column, with the water and nitrogen trichloride impurities being largely removed into the acid. The gas flow rate through the column was about 700 cc./minute and the acid flow rate was about 90 cc./minute. The temperature of the acid as it entered the column was about 0° C.

Analysis of the chlorine gas emerging from the top of the column revealed that the nitrogen trichloride concentration was less than 0.7 p.p.m. and the water content was about 600 p.p.m.

Example 2

Another sample of chlorine gas was processed as described in Example 1. The gas comprised about 12,100 p.p.m. water, about 36 p.p.m. nitrogen trichloride, and small amounts of other impurities. The gas temperature was about 31° C. and the gas pressure was about 748 torr. Gas flow rate through the column was about 580 cc./minute and acid flow rate was about 90 cc./minute. The temperature of acid entering the column was about minus 30° C.

Analysis of the chlorine gas emerging from the top of the column revealed that the nitrogen trichloride concentration was less than about 0.7 p.p.m. and the concentration of water was about 65 p.p.m.

Example 3

A chlorine gas sample was processed substantially as described in Examples 1 and 2. The sample comprised about 10,800 p.p.m. water, about 43 p.p.m. NCl₃, and about 49 p.p.m. of an aerosol brine spray. The brine spray consisted of 7.3 parts by weight NaCl and 42 parts by weight water.

The gas flow rate was about 700 cc./minute and the acid flow rate was about 90 cc./minute. Concentration of HCl in the acid was about 30%. Acid temperature was about minus 35° C.

The gas stream passing from the top of the column contained less than 0.4 p.p.m. NCl₃, about 28 p.p.m. water, and less than 0.1 p.p.m. of the brine aerosol.

Example 4

A stream of gaseous chlorine comprising 3600 p.p.m. water and 22 p.p.m. nitrogen trichloride was bubbled at a rate of about 1000 cc./minute through 492 g. of 26 weight percent hydrochloric acid. The acid temperature was about minus 60° C. The purified gaseous chlorine upon analysis was found to contain 10 p.p.m. water and 6 p.p.m. nitrogen trichloride.

Example 5

A stream of electrolytically-produced chlorine gas containing 11,200 parts per million by weight of water vapor, about 42 parts per million by weight of NCl₃ and 25 parts per million by weight of an aerosol liquid brine spray (consisting of 4.3 parts of sodium chloride and 21 parts of water) was allowed to pass upwards through a packed absorption tower, containing a five and a half foot deep bed of ceramic saddle packing (equivalent to about 3 transfer units). Hydrochloric acid (28%) cooled to about 10° C. was introduced at the upper end of the tower and passed downwards therethrough. The purified chlorine emerging from the top of the absorption tower comprised about 1100 parts per million by weight of water vapor, less than 0.4 part per million of nitrogen trichloride and less than 0.1 part per million of suspended aerosol sodium chloride.

Example 6

A stream of chlorine gas at 750 torr and 27° C. containing 8200 parts per million by weight of water and 31 parts per million by weight of nitrogen trichloride was fed at a rate of 550 cc./minute into the bottom of a 15-tray Oldershaw column down which 26 weight percent hydrochloric acid was recirculated at minus 55° C. at a rate of 90 cc./minute. Under these conditions of countercurrent acid-gas contacting, the gaseous chlorine condensed to form a liquid chlorine phase which ran from the bottom of the column as a separate liquid phase along with the hydrochloric acid. The liquid chlorine phase readily separated from the hydrochloric acid phase and was removed therefrom and analyzed. The purified liquid chlorine contained less than 4 p.p.m. of water and less than 0.4 p.p.m. of nitrogen trichloride.

What is claimed is:

1. A process for purifying chlorine which comprises contacting the chlorine with hydrochloric acid in the range of temperature between about minus 50° C. and about plus 100° C. and in the range of concentration between about 20 weight percent and about 30 weight percent.

2. A process as in claim 1 wherein the chlorine and acid are contacted counter-currently.

3. A process as in claim 1 and including the step of adding water to the impurity-laden acid phase previously separated from the chlorine, thereby to dilute the acid phase to an HCl concentration of less than about 20 weight percent HCl.

4. A process as in claim 1 wherein the acid temperature during the contacting step is from about plus 30° C. to about minus 50° C.

5. A process as in claim 1 wherein the acid temperature during the contacting step is from about plus 10° C. to about minus 34° C.

6. A process as in claim 1 comprising contacting chlorine with hydrochloric acid cooled sufficiently to liquefy at least part of the chlorine during contaction, and separating the liquefied chlorine from the liquid acid phase.

7. A process as in claim 6 wherein the acid temperature during contacting is from about minus 34° C. to about minus 50° C.

References Cited

UNITED STATES PATENTS 3,254,474   6/1966   Van Dijk _____ 55—71X

SAMIH N. ZAHARNA, Primary Examiner

R. W. BURKS, Assistant Examiner